(12) United States Patent
Kang et al.

(10) Patent No.: US 10,477,247 B2
(45) Date of Patent: Nov. 12, 2019

(54) METHOD FOR DECODING VIDEO USING IN-LOOP FILTER, AND DEVICE THEREFOR

(71) Applicants: Electronics and Telecommunications Research Institute, Daejeon (KR); Kwangwoon University Industry-Academic Collaboration Foundation, Seoul (KR)

(72) Inventors: Jung Won Kang, Daejeon (KR); Hyun Suk Ko, Daejeon (KR); Sung Chang Lim, Daejeon (KR); Jin Ho Lee, Daejeon (KR); Dong San Jun, Daejeon (KR); Hui Yong Kim, Daejeon (KR); Dong Gyu Sim, Seoul (KR); Seoung Jun Oh, Seongnam-si (KR); Jin Soo Choi, Daejeon (KR); Seoung Hwi Kim, Uijeongbu-si (KR); Sea Nae Park, Seoul (KR); Yong Jo Ahn, Seoul (KR); Dong Kyu Lee, Seoul (KR)

(73) Assignees: Electronics and Telecommunications Research Institute, Daejeon (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

(21) Appl. No.: 15/775,465

(22) PCT Filed: Nov. 18, 2016

(86) PCT No.: PCT/KR2016/013348
§ 371 (c)(1),
(2) Date: May 11, 2018

(87) PCT Pub. No.: WO2017/086740
PCT Pub. Date: May 26, 2017

(65) Prior Publication Data
US 2018/0359491 A1   Dec. 13, 2018

(30) Foreign Application Priority Data

Nov. 18, 2015  (KR) .................. 10-2015-0161602
Nov. 18, 2015  (KR) .................. 10-2015-0161653

(51) Int. Cl.
*H04N 19/82*     (2014.01)
*H04N 19/117*    (2014.01)
(Continued)

(52) U.S. Cl.
CPC .......... *H04N 19/82* (2014.11); *H04N 19/117* (2014.11); *H04N 19/176* (2014.11);
(Continued)

(58) Field of Classification Search
CPC ....................... H04N 19/82; H04N 19/117
(Continued)

(56) References Cited

U.S. PATENT DOCUMENTS 9,826,240 B2 * 11/2017 Mody ................. H04N 19/176
2014/0219337 A1   8/2014 Lee et al.
(Continued)

FOREIGN PATENT DOCUMENTS

KR   10-2007-0011147 A   1/2007
KR   10-2007-0042288 A   4/2007
(Continued)

OTHER PUBLICATIONS

International Search Report dated Feb. 27, 2017 in corresponding International Patent Application No. PCT/KR2016/013348 (3 pages in English and 3 pages in Korean).

*Primary Examiner* — Hee-Yong Kim
(74) *Attorney, Agent, or Firm* — NSIP Law

(57) ABSTRACT

The present invention provides a method and apparatus for encoding/decoding an image and for adjusting a reconstructed pixel by scaling an offset of an in-loop filter having
(Continued)

a scaled offset value. The method includes: obtaining information of a scale default value of a current block from a bitstream; obtaining offset parameter merge information of the current block from the bitstream; obtaining the offset parameter of the current block on the basis of the offset parameter merge information; determining whether a scale residual value of the current block is obtained from the bitstream on the basis of the offset parameter merge information; obtaining a scale value on the basis of the scale default value and the scale residual value; scaling an offset on the basis of the offset parameter and the scale value; and adjusting a pixel value of the current block on the basis of the scaled offset.

20 Claims, 10 Drawing Sheets

(51) Int. Cl.
| | | |
|---|---|---|
| *H04N 19/176* | (2014.01) |
| *H04N 19/30* | (2014.01) |
| *H04N 19/182* | (2014.01) |
| *H04N 19/44* | (2014.01) |
| *H04N 19/186* | (2014.01) |
| *H04N 19/70* | (2014.01) |
| *H04N 19/196* | (2014.01) |
| *H04N 19/86* | (2014.01) |
| *H04N 19/51* | (2014.01) |
| *H04N 19/593* | (2014.01) |

(52) U.S. Cl.
CPC ......... *H04N 19/182* (2014.11); *H04N 19/186* (2014.11); *H04N 19/196* (2014.11); *H04N 19/30* (2014.11); *H04N 19/44* (2014.11); *H04N 19/70* (2014.11); *H04N 19/86* (2014.11); *H04N 19/51* (2014.11); *H04N 19/593* (2014.11)

(58) Field of Classification Search
USPC .................................................. 375/240.02
See application file for complete search history.

(56) References Cited

U.S. PATENT DOCUMENTS

| | | |
|---|---|---|
| 2014/0286396 A1 | 9/2014 | Lee et al. |
| 2015/0195533 A1 | 7/2015 | Hsiang et al. |
| 2015/0350645 A1 | 12/2015 | Lee et al. |
| 2016/0100189 A1* | 4/2016 | Pang .................... H04N 19/593 375/240.13 |

FOREIGN PATENT DOCUMENTS

| | | |
|---|---|---|
| KR | 10-2007-0074495 A | 7/2007 |
| KR | 10-2012-0140515 A | 12/2012 |
| KR | 10-2013-0101485 A | 9/2013 |
| KR | 10-2014-0016974 A | 2/2014 |
| KR | 10-2014-0130171 A | 11/2014 |
| KR | 10-2015-0041772 A | 4/2015 |
| WO | WO 2012/099352 A | 7/2012 |
| WO | WO 2012/154576 A2 | 11/2012 |
| WO | WO 2013/177975 A1 | 12/2013 |
| WO | WO 2015/137785 A1 | 9/2015 |

* cited by examiner

METHOD FOR DECODING VIDEO USING IN-LOOP FILTER, AND DEVICE THEREFOR

CROSS REFERENCE TO RELATED APPLICATIONS

This application is a U.S. National Stage Application of International Application No. PCT/KR2016/013348, filed on Nov. 18, 2016, which claims the benefit under 35 USC 119(a) and 365(b) of Korean Patent Application No. 10-2015-0161602, filed on Nov. 18, 2015, and Korean Patent Application No. 10-2015-0161653, filed on Nov. 18, 2015in the Korean Intellectual Property Office.

TECHNICAL FIELD

The present invention relates to a method and apparatus for encoding/decoding an image and, more particularly, to a method and apparatus for adjusting a reconstructed pixel by scaling an offset of an in-loop filter and by using the in-loop filter having a scaled offset value.

BACKGROUND ART

As broadcast services having high-resolution/high quality have been generalized due to technology development, there is growing interest in ultra high definition (UHD), which has a resolution four or more times higher than high definition (HD) resolution. High dynamic range (HDR) and wider color gamut (WCG) techniques are new issues, and thus, research on next generation image technologies is actively being conducted to overcome the limitations of conventional compression technology.

In addition, there have been attempts to enhance compression efficiency in technical fields of prediction, transform, quantization, entropy encoding, etc. In order to reduce distortion, error, blocking effect, ringing effect, etc. that occurs with a reconstructed picture, applying an in-loop filter is also required to be considered in terms of enhancing compression efficiency.

DISCLOSURE

Technical Problem

The present invention is intended to propose a method and apparatus for enhancing encoding/decoding compression efficiency of an image.

Specifically, the present invention is intended to propose a method and apparatus adaptively obtaining a parameter for scaling an offset from a bitstream or a neighboring block.

In addition, the present invention is intended to propose a method and apparatus for deriving a scale value by using a scale residual value in a case of scaling an offset of an in-loop filter.

It is to be understood that technical problems to be solved by the present disclosure are not limited to the aforementioned technical problems and other technical problems that are not mentioned will be apparent from the following descriptions to a person with an ordinary skill in the art to which the present disclosure pertains.

Technical Solution

In order to achieve the above object, according to one aspect of the present invention, there is provided a method for decoding a video signal, the method including: obtaining information of a scale default value of a current block from a bitstream; obtaining offset parameter merge information of the current block from the bitstream, wherein the offset parameter merge information indicates whether or not an offset parameter of the current block is the same as at least one of neighboring blocks adjacent to the current block; obtaining the offset parameter of the current block on the basis of the offset parameter merge information; determining whether or not a scale residual value of the current block is obtained from the bitstream on the basis of the offset parameter merge information, wherein when the offset parameter merge information indicates that the offset parameter of the current block is different from the neighboring blocks adjacent to the current block, the scale residual value is obtained from the bitstream; obtaining a scale value on the basis of the scale default value and the scale residual value; scaling an offset on the basis of the offset parameter and the scale value; and adjusting a pixel value of the current block on the basis of the scaled offset.

According to another aspect, there is provided an apparatus for decoding a video signal, the apparatus including: an offset merge information parsing unit obtaining offset parameter merge information of a current block from a bitstream, wherein the offset parameter merge information indicates whether or not an offset parameter of the current block is the same as at least one of neighboring blocks adjacent to the current block; an offset parameter reconstruction unit obtaining the offset parameter of the current block on the basis of the offset parameter merge information; a scale parameter reconstruction unit determining whether or not a scale parameter of the current block is obtained from the bitstream on the basis of the offset parameter merge information, wherein when the offset parameter merge information indicates that the offset parameter of the current block is different from the neighboring blocks adjacent to the current block, a scale residual value is obtained from the bitstream; an offset determination unit obtaining a scale value on the basis of a scale default value and the scale residual value, and scaling an offset on the basis of the offset parameter and the scale value; and an offset application unit adjusting a pixel value of the current block on the basis of the scaled offset.

The following contents may be commonly applied to the method and apparatus according to the above-described aspects.

When the offset parameter merge information indicates that the offset parameter of the current block is the same as at least one of the neighboring blocks adjacent to the current block, the scaled offset of the current block may be derived from at least one of the neighboring blocks.

A unit of signaling the scale default value and a unit of signaling the scale residual value may be different from each other.

The scale residual value may be obtained for each color component and each offset type.

A scale residual value of a predetermined color component may be derived to be the same as a scale residual value of a previous color component.

A scale residual value of a predetermined offset type of a predetermined color component may be used as a scale residual value of a remaining offset type of the predetermined color component.

The scale residual value may indicate a difference between scale residual values of a predetermined color component and of a previous color component, or a difference between scale residual values of a predetermined offset type and of a previous offset type.

The neighboring block may includes at least one of a spatial neighboring block spatially adjacent to the current block, and a temporal neighboring block temporally adjacent to the current block.

The offset parameter of the current block may be derived from a neighboring block indicated by index information parsed from the bitstream.

It is to be understood that the foregoing summarized features are exemplary aspects of the following detailed description of the present invention without limiting the scope of the present invention.

Advantageous Effects

According to the present invention, it is possible to provide the method and apparatus for enhancing encoding/decoding compression efficiency of an image.

In addition, according to the present invention, it is possible to provide the method and apparatus for adaptively obtaining a parameter for scaling an offset from a bitstream or a neighboring block.

In addition, according to the present invention, it is possible to provide the method and apparatus for deriving a scale value by using a scale residual value in a case of scaling an offset of an in-loop filter.

Effects that may be obtained from the present invention will not be limited to only the above described effects. In addition, other effects which are not described herein will become apparent to those skilled in the art from the following description.

MODE FOR INVENTION

Figure 1:
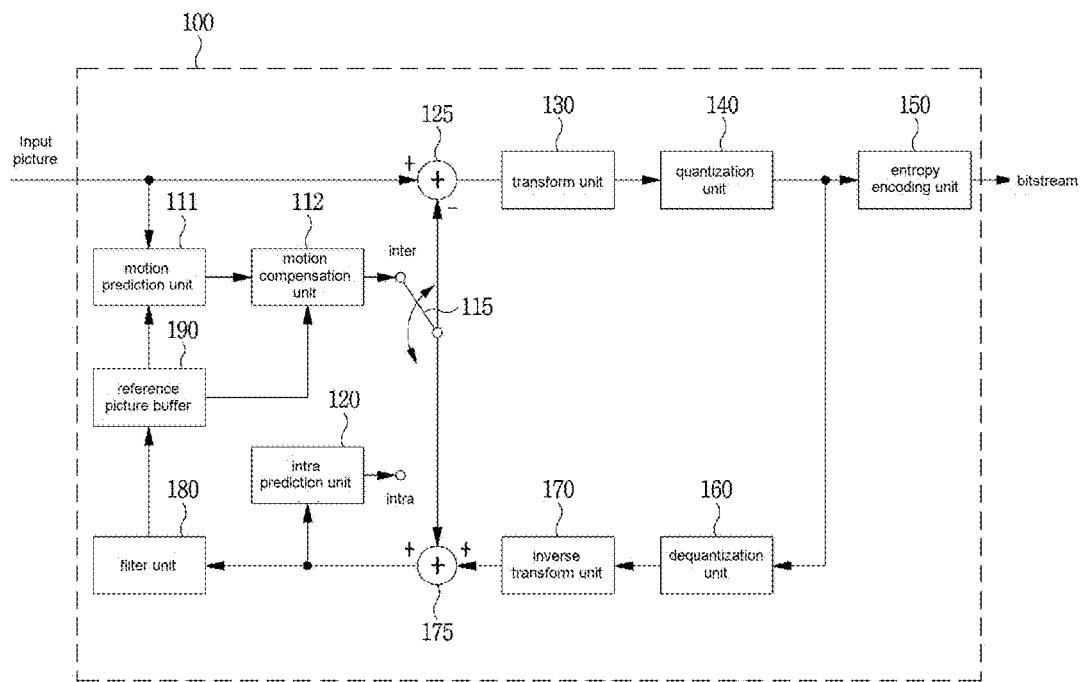
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without being departed from the scope of the present invention and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

The specific terms that are used in the description can be briefly explained as follows.

A video encoding apparatus or an encoder mean an apparatus performing encoding, and a video decoding apparatus or a decoder mean an apparatus performing decoding. The encoder and the decoder may be a device that is included in a personal computer (PC), a notebook computer, a portable multimedia player (PMP), a wireless communication terminal, a smart phone, and a server terminal for a TV application server, service server, etc. In addition, various user terminals such as the encoder, the decoder, etc. may include a communication device such as a communication modem for performing communications in wired/wireless communication networks, etc., a memory for storing various programs and data for encoding/decoding an image, or for inter or intra prediction to perform encoding/decoding, and a microprocessor for executing programs to effect operations and controls.

The image encoded by the encoder into a bitstream may be transmitted to the decoder in real time or non-real time via a wired/wireless communication network including the Internet, a short range wireless communication network, a wireless LAN network, WiBro (Wireless Broadband), and a mobile communication network, or via various communication interfaces such as a cable, a Universal Serial Bus (USB), etc. The decoder may decode the image received from the encoder, and may play a reconstructed image.

Dynamic range (DR) generally means a difference between the maximum signal and the minimum signal that may be simultaneously measured in a measurement system. In a field of image processing and video compression, the dynamic range may mean a range of brightness that may be expressed by an image.

A video may be composed of a series of pictures, and each of the pictures may be encoded/decoded by being partitioned into encoding/decoding units. An encoding/decoding unit may be referred to as a unit or a block. Depending on functions, the unit or the block may mean a macroblock, a coding tree unit, a coding tree block, a coding unit, a coding block, a prediction unit, a prediction block, a transform unit, a transform block, etc. A picture may be replaced with another term such as an image or a frame, etc. having the same meaning as the picture.

Based on the above-described descriptions, descriptions of the present invention will be disclosed in detail.

FIG. 1 is a block diagram showing configurations of an encoding apparatus according to an embodiment of the present invention.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction signal of an input block of the input picture. The prediction signal, which is a block unit, may be referred to as a prediction block. In addition, after generating the prediction block, the encoding apparatus 100 may encode residuals between the input block and the prediction block. The input picture may be referred to as a current picture that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, it is determined based on the coding unit that which inter-prediction and motion compensation method is used among a skip mode, a merge mode, and an AMVP mode. And the inter-prediction or motion compensation is performed depending on the mode.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

According to the probability distribution, the entropy encoding unit 150 may generate the bitstream by performing entropy encoding on values calculated by the quantization unit 140 or on coding parameter values calculated in an encoding process, etc., and may output the bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may perform the entropy encoding by using variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional block form coefficient may be changed into the one-dimensional vector form by scanning the coefficient of the block with up-right scanning. Depending on both the size of the transform unit and the intra-prediction mode, instead of the up-right scanning, it is possible to use vertical scanning that scans the two-dimensional block form coefficient in a column direction, and horizontal scanning that scans the two-dimensional block form coefficient in a row direction. That is, it is possible to determine which scanning method among the up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one of the intra-prediction mode, the inter-prediction mode, the intra-prediction direction, the motion information, the motion vector, reference picture index, the inter-prediction direction, the inter-prediction indicator, the reference picture list, the motion vector predictor, the merge candidate, the type of transform, the size of transform, the information about whether or not an additional transform is used, the filter information within a loop, the information about whether or not a residual signal is present, the quantization parameter, the context model, the transform coefficient, transform coefficient level, the coded block pattern, the coded block flag, the image display/output order, the slice information, the tile information, the picture type, the information about whether or not the merge mode is used, the information about whether or not the skip mode is used, the block size, the block depth, the block partition information, the unit size, the unit depth, and the value of the unit partition information, etc. or the statistics thereof or both.

The residual signal may mean the difference between the original signal and the prediction signal. The residual signal may mean the difference between the original signal and the prediction signal. In addition, the residual signal may be a signal generated by transforming the difference between the original signal and the prediction signal from a spatial domain to a frequency domain. In addition, the residual signal may be a signal generated by transforming and quantizing the difference between the original signal and the prediction signal. The residual block may be the residual signal, which is a block unit. In addition, the residual signal may be a signal generated by transforming the difference between the original signal and the prediction signal. In addition, the residual signal may be a signal generated by transforming and quantizing the difference between the original signal and the prediction signal.

When the encoding apparatus 100 performs encoding by using inter prediction, the encoded current picture may be used as a reference picture for another image(s) that will be processed thereafter. Therefore, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170.

The dequantized and inversely transformed coefficient may be added to the prediction block by the adder 175. A reconstructed block may be generated by adding a residual block generated by the dequantization and the inverstraform and the prediction block.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel when performing vertical filtering and horizontal filtering.

The sample adaptive offset may add an optimum offset value to the pixel value in order to compensate for an encoding error. The sample adaptive offset may correct an offset between the deblocking filtered image and the original picture for each pixel.

A pixel adjustment type based on the sample adaptive offset includes an edge type and a band type. One of an offset adjustment method and a sample adaptive filter (SAF) method may be used on the basis of the determined pixel adjustment type.

When the offset adjustment method is used, an offset that is used to compensate for an original picture may be scaled on the basis of a scale value. In order to scale an offset, an offset parameter including both an offset type and an offset value, and a scale parameter for determining a scale value may be obtained from a bitstream or a neighboring block.

In order to perform the offset correction on a specific picture, it is possible to use a method of applying an offset correction in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied may be transmitted to each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
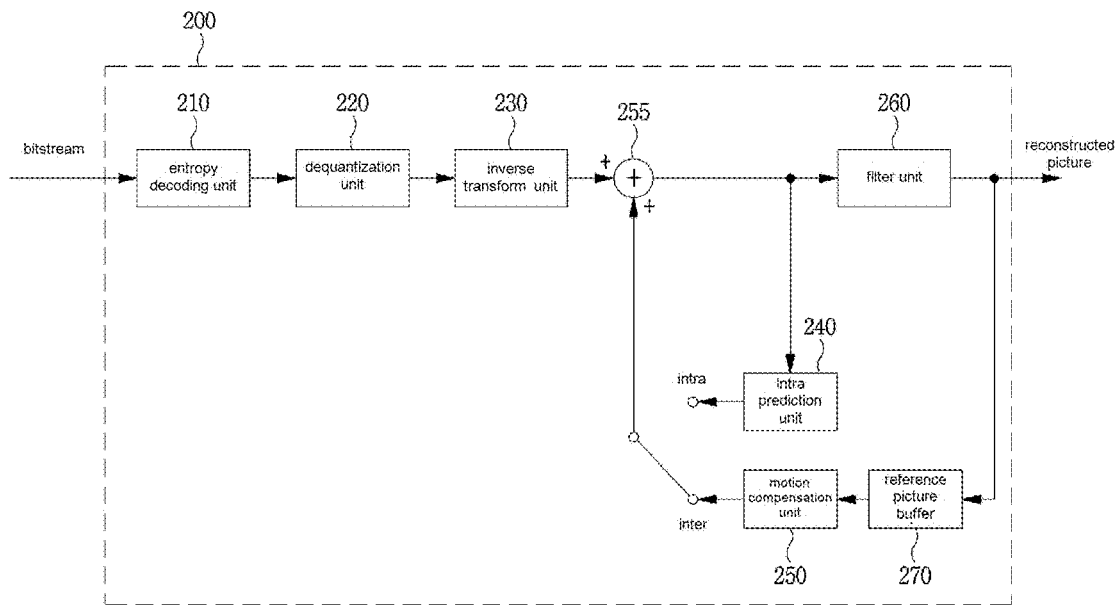
FIG. 2 is a block diagram showing configurations of a decoding apparatus according to an embodiment of the present invention.

FIG. 2 is a block diagram showing configurations of a decoding apparatus according to an embodiment of the present invention.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level and information required to decoding the video data. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may change the one-dimensional vector form coefficient into the two-dimensional block form by using the transform coefficient scanning method. For example, the one-dimensional vector form coefficient may be changed into a two-dimensional block form by scanning the coefficient of the block with up-right scanning. Depending on both the size of the transform unit and the intra-prediction mode, instead of up-right scanning, it is possible to use vertical scanning and horizontal scanning. That is, it is possible to determine which scanning method among the up-right scanning, the vertical direction scanning, and the horizontal direction scanning is used depending on the size of the transform unit and the intra-prediction mode.

The quantized transform coefficient level may be dequantized by the dequantization unit 220, and may be inversely transformed from a frequency domain to a spatial domain by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block in a spatial domain by performing the spatial prediction that uses the pixel value of the previously decoded block that is adjacent to the decoding target block.

When the inter mode is used, the motion compensation unit 250 may generate the prediction block in a spatial domain by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, it is possible to determine on the basis of the coding unit which the motion compensation method of a prediction unit in the coding unit is used among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may be not adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of refIdx=0 or the last position) within the reference picture list for the decoding target block. In addition, it is possible to be variably positioned within the reference picture list, and to this end, it is possible to signal the reference picture index indicating a position of the current picture.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel when performing vertical filtering and horizontal filtering.

The sample adaptive offset may add an optimum offset value to the pixel value in order to compensate for an encoding error. The sample adaptive offset may correct an offset between the deblocking filtered image and the original picture by a pixel.

A pixel adjustment type based on the sample adaptive offset includes an edge type and a band type. One of an offset adjustment method and a sample adaptive filter (SAF) method may be used on the basis of the determined pixel adjustment type.

When the offset adjustment method is used, an offset that is used to compensate for an original picture may be scaled on the basis of a scale value. In order to scale an offset, an offset parameter including both an offset type and an offset value, and a scale parameter for determining a scale value may be obtained from a bitstream or a neighboring block.

In order to perform the offset correction on a specific picture, it is possible to use a method of applying an offset correction in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information, such as a luma signal, about whether or not the adaptive loop filter is applied may be transmitted to each coding unit CU. A shape and a filter coefficient of an adaptive loop filter being applied to each block may vary. In addition, an adaptive loop filter having the same form (fixed form) may be applied regardless of characteristics of a target block.

The filter unit 260 may output a reconstructed picture. The reconstructed picture may be stored in a reference picture buffer 270 to be used for inter prediction.

As described above with reference to FIGS. 1 and 2, in order to reduce distortion, error, blocking effect, ringing effect, etc. that occurs at a reconstructed block, an in-loop filter may be applied to the reconstructed block. In the present invention, among in-loop filtering techniques, a method (for example, a sample adaptive offset) of filtering a reconstructed block by using an offset value will be disclosed in detail. Following embodiments will be disclosed on the basis of a decoder, but the following embodiments may be applied to an encoder.

In order to enhance compression efficiency of a video, the present invention provides a method of upscaling an offset value of an in-loop filter. A bit amount for transmitting an offset value may be reduced by transmitting a down-scaled offset value through a bitstream. Hereinafter, descriptions of the present invention will be disclosed in detail with reference to the accompanying drawings.

Figure 3:
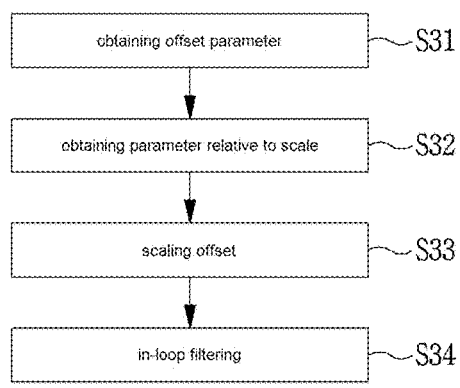
FIG. 3 is a flow chart showing a method of obtaining a scale value for scaling an offset of an in-loop filter according to an embodiment of the present invention.

FIG. 3 is a flow chart showing a method of obtaining a scale value for scaling an offset of an in-loop filter according to an embodiment of the present invention.

In order to apply an in-loop filter to a current block, an offset parameter of a current block may be obtained at step S31. The offset parameter may include an offset type and an offset value of the offset type. Here, the offset type may indicate an edge index or a band index depending on whether an edge offset or a band offset is applied, but it is not limited thereto.

The offset parameter may be derived from a neighboring block, or may be obtained from a bitstream depending on whether or not an offset parameter of a current block is the same as an offset parameter of a neighboring block.

In order to apply an in-loop filter to a current block, a parameter relative to a scale value that will be applied to an offset may be obtained at step S32. A parameter (namely, a scale parameter) for obtaining a scale value may include a parameter relative to at least one of a scale default value, a scale residual value, and a reconstructed scale value.

The scale default value indicates a default offset value of each color component or each pixel band, and the scale residual value indicates a residual value between a scale value and the scale default value. A scale value of predetermined color component or a pixel band may be reconstructed on the basis of the scale default value and the scale residual value.

Here, in order to reduce overhead that is caused by transmitting a scale default value, a unit of signaling a scale default value may be larger than a unit of signaling a scale residual value. For example, a scale default value may be signaled for each picture group or each picture; however, a scale residual value may be signaled for each decoding block.

Alternatively, a scale value may be derived from a neighboring block instead of obtaining a scale value on the basis of a scale default value and a scale residual value.

A process of obtaining a parameter relative to a scale value may be selectively performed depending on whether merge possibility of a scale parameter is dependent or independent on merge possibility of an offset parameter.

For example, under a method of determining merge possibility of a scale parameter depending on merge possibility of an offset parameter (hereinafter, referred to as a dependent merging method), whether or not a scale parameter is parsed through a bitstream may be selectively determined. However, under a method of determining merge possibility of a scale parameter separately from merge possibility of an offset parameter (hereinafter, referred to as an independent merging method), a parameter relative to a scale value may be selectively obtained from one of a neighboring block and a bitstream.

When an offset parameter and a scale parameter are determined, an offset may be scaled at step S33. For example, an offset may be upscaled by bit shift operation or multiplication operation.

Next, in-loop filtering may be performed on a decoding unit block (or an encoding unit block) by using the upscaled offset at step S34.

In the following embodiments, a method of obtaining an offset parameter and a scale parameter will be disclosed in priority based on the dependent merging method and the independent merging method. First, configurations of a decoder for performing the dependent merging method and the independent merging method will be disclosed, and next, a method of obtaining an offset parameter and a scale parameter depending on dependent and independent merging methods will be disclosed in detail.

A method of applying an in-loop filter shown in FIG. 3 may be a process that is selectively performed depending on whether or not an in-loop filter is applied to a reconstructed block. In addition, processes of obtaining a scale parameter and of scaling an offset on the basis of an obtained scale value are selectively performed depending on whether or not an offset of an in-loop filter is scaled.

Accordingly, the decoder determines whether or not an in-loop filter is applied to a reconstructed block. When determining the in-loop filter is applied to the reconstructed block, whether or not an offset of then in-loop filter is scaled may be determined. Depending on whether or not an offset of an in-loop filter is scaled, obtaining a scale parameter and scaling an offset, shown in FIG. 3, are selectively performed.

Here, whether or not the in-loop filter is applied to the reconstructed block may be determined on the basis of information indicating whether the in-loop filter is applied to the reconstructed block. Whether or not the offset of the in-loop filter is scaled may be determined on the basis of information indicating whether the offset of the in-loop filter is scaled. The information of whether or not the in-loop filter is applied to the reconstructed block and the information of whether or not the offset of the in-loop filter is scaled may be respective 1 bit flag information, without being limited thereto.

The information of whether or not the in-loop filter is applied to the reconstructed block and the information of whether or not the offset of the in-loop filter is scaled may be obtained from a bitstream. The information of whether or not the in-loop filter is applied to the reconstructed block and the information of whether or not the offset of the in-loop filter is scaled may be encoded by a unit of a picture group, a picture, a slice, or a decoding block (or a coding block). Here, a unit of a decoding block (or a unit of a coding block) is a unit that encoding/decoding is performed on, and may mean a macroblock, a coding tree unit, a coding unit, a prediction unit or a transform unit, etc.

In order to obtain, from a bitstream, both the information of whether or not the in-loop filter is applied to the reconstructed block and the information of whether or not the offset of the in-loop filter is scaled, the decoder may include a parsing unit for parsing a parameter from the bitstream. Here, the parsing unit may be implemented as a part of an entropy decoding unit of FIG. 2, or may be implemented as a component that is separate from the entropy decoding unit.

Figure 4:
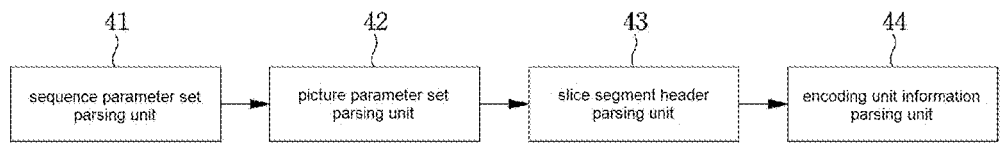
FIG. 4 is a view showing configurations of a parsing unit of a decoder.

FIG. 4 is a view showing configurations of a parsing unit of a decoder.

Referring to FIG. 4, the parsing unit may include a sequence parameter set parsing unit 41, a picture parameter set parsing unit 42, a slice segment header parsing unit 43, and an encoding unit information parsing unit 44.

For each predetermined unit, the decoder may parse both a parameter for decoding and decoded video information from a bitstream by using the enumerated components. Next, the parsed parameter and the parsed information are used to perform entropy decoding, dequantization, inverse transform, prediction, motion compensation, etc. for each predetermined unit (for example, a picture group, a picture, a slice, a tile, an encoding/decoding block, etc.), thereby reconstructing a picture.

The sequence parameter set parsing unit 41 parses information from a sequence parameter set. For example, when the information of whether or not the in-loop filter is applied to the reconstructed block and the information of whether or not the offset of the in-loop filter is scaled are encoded for each video sequence (namely, for each picture group), the sequence parameter set parsing unit may parse the relevant information from a bitstream.

The picture parameter set parsing unit 42 parses information from a picture parameter set. For example, when the information of whether or not the in-loop filter is applied to the reconstructed block and the information of whether or not the offset of the in-loop filter is scaled are encoded for each picture, the picture parameter set parsing unit may parse the relevant information from a bitstream.

The slice segment header parsing unit 43 parses information from a slice header. For example, when the information of whether or not the in-loop filter is applied to the reconstructed block and the information of whether or not the offset of the in-loop filter is scaled are encoded for each slice, the slice segment header parsing unit may parse the relevant information from a bitstream.

The encoding unit information parsing unit 44 parses information for decoding each encoding/decoding block. For example, when the information of whether or not the in-loop filter is applied to the reconstructed block and the information of whether or not the offset of the in-loop filter is scaled are encoded for each encoding/decoding block, the encoding unit information parsing unit may parse the relevant information from a bitstream.

In the above-described embodiments, it is described that both the information of whether or not the in-loop filter is applied to the reconstructed block and the information of whether or not the offset of the in-loop filter is scaled are parsed from a bitstream.

For another example, the information of whether or not the offset of the in-loop filter is scaled may not be signaled from a bitstream. In this case, whether or not an offset is scaled may be determined depending on whether or not an in-loop filter is applied to a reconstructed block. For example, when determining an in-loop filter is applied to a reconstructed block, the decoder may perform a series of processes for scaling an offset of an in-loop filter.

When determining an offset of an in-loop filter is scaled, the decoder may obtain information for scaling an offset of an in-loop filter. The information for scaling an offset of an in-loop filter may be encoded for each picture group, each picture, each slice, or each encoding/decoding block. Accordingly, the decoder may parse information for scaling an offset of an in-loop filter by using at least one of the sequence parameter set parsing unit 41, the picture parameter set parsing unit 42, the slice segment header parsing unit 43, and the encoding unit information parsing unit 44.

For example, when the information for scaling an offset of an in-loop filter is decoded for each picture group, the information may be parsed through the sequence parameter set parsing unit 41. Alternatively, when the information for scaling an offset of an in-loop filter is decoded for each picture, the information may be parsed through the picture parameter set parsing unit 42.

The information for scaling an offset of an in-loop filter may include information of a scale residual value and information of a scale default value. By using a scale default value and a scale residual value, the decoder may obtain a scaling value for a color component or for an offset type or for both.

Here, information of a scale default value may be related to information of a default scale value depending on a pixel range of a color component. Specifically, the information of the scale default value may partition a pixel range of a color component into at least one band, and may be about a default scale value of each of the partitioned bands. To this end, information of a scale default value may include at least one of information about whether or not a pixel band is equally partitioned, the number of pixel bands, information of a start position of a pixel band, and information of a default scale value for each pixel band. Here, the information about whether or not a pixel band is equally partitioned may be defined as 'band_uniform_partition_flag' that is a 1 bit flag, without being limited thereto.

In the above-described example, at least one of the information about whether or not a pixel band is equally partitioned, the number of pixel bands, the information of a start position of a pixel band, and the information of a default scale value for each pixel band may not be signaled through a bitstream. In this case, the decoder may autonomously determine a setting of a pixel band depending on a dynamic range or a bit depth of a video.

An example of partitioning a pixel range of a color component into a plurality of pixel bands will be disclosed later with reference to FIG. 5.

Information of a scale default value and information of a scale residual value may be set to have difference encoding units. For example, a unit of encoding information of a scale default value may be larger than a unit of encoding a scale residual value. For example, information of a scale default value may be encoded for each video sequence or each picture while information of a scale residual value may be encoded for each decoding block.

For another example, information of a scale default value may be predicted from a neighboring block that is adjacent to a current block. In this case, a scale value may be reconstructed on the basis of both the predicted information of the scale default value, and a scale residual value being obtained from a bitstream or a neighboring block.

The decoder may parse information indicating whether or not at least one of an offset parameter and a scale parameter of a current unit entity is the same as a neighboring entity that is adjacent to a current entity. Here, the current entity may mean a current picture group, a current picture, a current slice, or a current encoding/decoding block. The neighboring entity that is adjacent to the current entity may mean a picture group, a picture, a slice, or an encoding/decoding block that are spatially or temporally adjacent to the current unit entity.

When at least one of an offset parameter or a scale parameter of a current entity is the same as the current unit entity, a scale value of a current entity may be derived on the basis of a parsed scale default value and a parsed scale residual value of a neighboring entity.

Information for scaling an offset of an in-loop filter may be signaled for each color component. For example, at least one of both information of a scale residual value and information of a scale default value may be signaled for each luma component and each chroma component.

Figure 5:
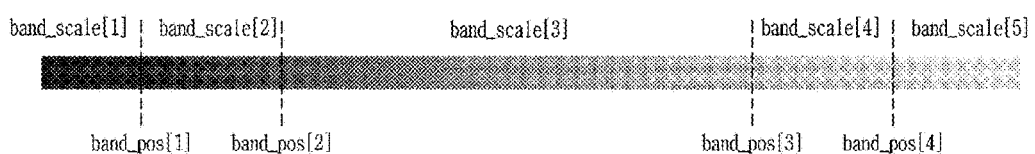
FIG. 5 is a view showing an example of partitioning a pixel range of a color component into a plurality of pixel bands.

FIG. 5 is a view showing an example of partitioning a pixel range of a color component into a plurality of pixel bands.

For convenience of description, it is assumed that a pixel band is unequally partitioned (for example, when the value of band_uniform_partition_flag is 0), and the number (num_band) of pixel bands is 5.

In an example shown in FIG. 5, band_pos[x] (x is an integer in a range of 1~4) indicate start positions of the second to fifth pixel bands. When a pixel band is unequally partitioned, a start position of a pixel band may be determined on the basis of information that is decoded from a bit stream.

When a pixel band is equally partitioned and the number of pixel bands is determined, a start point of a pixel range (for example, from 0 to $2^{b-1}$ (here, b indicates bit depth)) of a predetermined color component may be determined without information of a start position of a pixel band. Accordingly, when a pixel band is equally partitioned, information of a start position of a pixel band may not be signaled. In addition, the decoder may autonomously determine the number of pixel bands, and thus, information of the number of pixel bands may not be signaled.

In FIG. 5, band_scale[y] (y is an integer in a range of 1~5) indicates a default scale value of each pixel band. The default scale value of each pixel band may be determined on the basis of information obtained from a bitstream.

For another example, the decoder may autonomously determine the default scale value of each pixel band. In this case, information of the default scale value of each pixel band may not be signaled.

As described above, information for partitioning and information of a default scale value of each pixel band may not be signaled. The decoder may autonomously partition a pixel band, or may determine a default scale value of each pixel band.

Next, an example of obtaining a scale value on the basis of a default scale value and a scale residual value will be disclosed in detail.

A scale value may be obtained by a method (namely, a dependent merging method) of determining merge possibility of a scale parameter depending on merge possibility of an offset, or a method (namely, an independent merging method) of determining merge possibility of a scale parameter separately from merge possibility of an offset parameter. Hereinafter, an example of obtaining a scale value according to the methods will be disclosed in detail.

Figure 6:
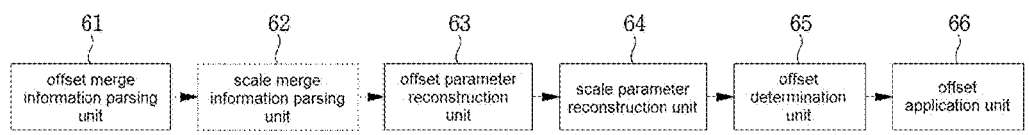
FIG. 6 is a view showing configurations of a decoder obtaining a scaling value by using a dependent merging method and an independent merging method.

FIG. 6 is a view showing configurations of a decoder obtaining a scaling value by using a dependent merging method and an independent merging method. Referring to FIG. 6, the decoder may include an offset merge information parsing unit 61, a scale merge information parsing unit 62, an offset parameter reconstruction unit 63, a scale parameter reconstruction unit 64, an offset determination unit 65, and an offset application unit 66. The above-described components may be implemented as a part of an entropy decoding unit and a part of a filter unit that are shown in FIG. 2, or may be implemented separately therefrom.

For convenience of description, it is assumed that an in-loop filter is performed for each encoding/decoding block. In addition, the encoding/decoding block to which the in-loop filter is applied is referred to as 'a current block'.

The offset merge information parsing unit 61 may parse, from a bitstream, information of whether or not an offset parameter of a current block is the same as at least one of neighboring blocks adjacent to the current block. Hereinafter, the information of whether or not an offset parameter of a current block is the same as at least one of neighboring blocks adjacent to the current block is referred to as 'offset merge information.' The offset merge information may be a 1 bit flag, without being limited thereto.

A neighboring block adjacent to a current block may include both a neighboring block spatially adjacent to the current block, and a neighboring block temporally adjacent to the current block. For example, the neighboring block spatially adjacent to the current block may include at least one of blocks that are positioned at the left, the lower left, the upper left, the upper, and the upper right of the current block. The neighboring block temporally adjacent to the current block may include a block collocated with a current block in a picture having a temporal order different from that of a current picture including a current block.

In a dependent merging method, whether or not a scale parameter is merged into a neighboring block may be determined depending on offset merge information. For example, when offset merge information indicates that an offset parameter of a current block is merged into a neighboring block, it is assumed that a scale parameter of a current block and a neighboring block are the same, and thus, a process of omitting a scale parameter from a bitstream may be omitted. In contrast, when offset merge information indicates that an offset parameter of a current block is not merged into a neighboring block, it is assumed that a scale parameter of a current block is not merged into a neighboring block, and thus, a scale parameter may be parsed and entropy decoded from a bitstream.

In an independent merging method, whether or not a scale parameter is merged into a neighboring block is independent of offset merge information. For example, even though offset merge information indicates that an offset parameter of a current block is merged into a neighboring block, whether or not a scale parameter of a current block is merged into a neighboring block may be separately determined. Similarly, even though an offset parameter of a current block is not merged into a neighboring block, whether or not a scale parameter of a current block is merged into a neighboring block may be separately determined.

Accordingly, when using the independent merging method, information of whether a scale parameter of a current block is the same as at least one of neighboring blocks adjacent to a current block may be parsed through the scale merge information parsing unit 62. Hereinafter, the information of whether a scale parameter of a current block is the same as at least one of neighboring blocks adjacent to a current block is referred to as 'scale merge information.' The scale merge information may be a 1 bit flag, without being limited thereto.

The offset parameter reconstruction unit 63 may reconstruct an offset parameter of a current block on the basis of offset merge information. Specifically, the offset parameter reconstruction unit may reconstruct an offset type and/or an offset value among an offset parameter.

For example, when offset merge information indicates that an offset parameter of a current block is different from at least one of neighboring blocks adjacent to a current block (namely, when an offset parameter is not merged into a neighboring block), information for reconstructing an offset parameter of a current block may be parsed from a bitstream, and the offset parameter may be reconstructed on the basis of the parsed information. In contrast, when offset merge information indicates that an offset parameter and a scale parameter of a current block are the same as at least one of neighboring blocks adjacent to a current block (namely, when an offset parameter is merged into a neighboring block), an offset parameter of a current block may be reconstructed by using an offset parameter of a neighboring block instead of parsing information for reconstructing an offset parameter from a bitstream.

The scale parameter reconstruction unit 64 may reconstruct a scale parameter of a current block on the basis of offset merge information and scale merge information.

In a dependent merging method, on the basis of offset merge information, the scale parameter reconstruction unit 64 may determine whether or not a scale parameter of a current block is reconstructed. For example, when offset merge information indicates that an offset parameter of a current block is the same as at least one of neighboring blocks adjacent to a current block, the scale parameter reconstruction unit may omit reconstructing a scale parameter. Since an offset value of a previously upscaled neighboring block is used as an offset value of a current block, a parameter for scaling is unnecessary.

In contrast, when offset merge information indicates that an offset parameter and a scale parameter of a current block are different from at least one of neighboring blocks adjacent to a current block, the scale parameter reconstruction unit 64 may parse information of a scale parameter of a current block from a bitstream, and may reconstruct a scale parameter on the basis of the parsed information.

In an independent merging method, the scale parameter reconstruction unit 64 may reconstruct a scale parameter of a current block on the basis of scale merge information. For example, when scale merge information indicates that a scale parameter of a current block is the same as at least one of neighboring blocks adjacent to a current block (namely, when a scale parameter is merged into a neighboring block), a scale parameter of a current block may be reconstructed by using a scale parameter of a neighboring block instead of parsing information for reconstructing an offset parameter from a bitstream.

In contrast, when scale merge information indicates that a scale parameter of a current block is different from at least one of neighboring blocks adjacent to a current block, information of a scale parameter of a current block may be parsed from a bitstream, and a scale parameter may be reconstructed on the basis of the parsed information.

As described above, when an offset parameter is not merged into a neighboring block in the dependent merging method or when a scale parameter is not merged into a neighboring block in the independent merging method, the scale parameter reconstruction unit 64 may parse a scale residual value from a bitstream for each color component and/or for each offset value.

Here, the scale residual value may be defined as 'delta_scale[i][j].' A color component relative to a scale residual value is designated by i having a value ranging 1 . . . N (or 0 . . . N−1), and the number of color components is designated by N. An index of an offset relative to a scale residual value is designated by j having a value ranging 1 . . . M (or 0 . . . M−1), and the number of offsets is designated by M.

A scale residual value may indicate a residual value between a scale value and a default scale value that are relative to a predetermined color component and/or a predetermined offset. For example, delta_scale[i][j] may indicate a residual value between a scale value and a default scale value that are relative to the ith color component and the jth offset. In this case, the scale parameter reconstruction unit 64 may obtain a scale value on the basis of a default scale value and a scale residual value.

For another example, except the first scale residual value, a remaining scale residual value may indicate a residual value with a scale residual value of a previous color component, or may indicate a residual value with a scale residual value of a previous offset. For example, delta_scale[i+1][j] may indicate a residual value with delta_scale[i][j], or delta_scale[i][j+1] may indicate a residual value with delta_scale[i][j]. In this case, the scale parameter reconstruction unit 64 may obtain a scale value of the kth color component on the basis of both a default scale value and the sum of scale residual values of from the first color component to the kth color component, or may obtain a scale value of the kth offset on the basis of both a default scale value and the sum of scale residual values of from the first offset to the kth offset.

A scale residual value may be signaled for each color component and each offset type. Alternatively, a plurality of color components may use a common scale residual value, or a plurality of offsets may use a common scale residual value.

Here, information indicating whether or not a plurality of color components uses the same scale residual value and/or whether or not a plurality of offsets uses the same scale residual value may be signaled through a bitstream. The scale parameter reconstruction unit 64 may parse, from a bitstream, at least one of information indicating whether or not a plurality of color components uses the same scale residual value, and information indicating whether or not a color component uses a common scale residual value with regard to a plurality of offsets. Depending on the information, the scale parameter reconstruction unit may determine whether the common scale residual value is used for each color component or each offset type.

The information indicating whether or not a plurality of color components uses the same scale residual value may indicate that a scale residual value of a current color component is the same as a scale residual value of a previous color component. The information may be defined as 'scale_merge_color[k]' that is a 1 bit flag, without being limited thereto. Here, an index of a color component is designated by k.

For example, when scale_merge_color[k] is 0, it may indicate that the kth color component does not use a common scale residual value with the k−1th color component. In this case, a scale residual value of the kth color component may be parsed, and a scale value of the kth color component may be reconstructed by using the parsed scale residual value.

When scale_merge_color[k] is 1, it may indicate that the kth color component uses a common scale residual value with the k−1th color component. In this case, a scale residual value of the kth color component is not signaled, and a scale residual value of the k−1th color component may be used as a scale residual value of the kth color component.

With regard to a plurality of offsets, information indicating whether or not a predetermined color component uses a common scale residual value may be defined as 'scale_merge' that is a 1 bit flag, without being limited thereto.

For example, when scale_merge is 1, it may indicate that a predetermined color component has a common scale residual value regardless of an offset type. Accordingly, the scale parameter reconstruction unit 64 may use a scale residual value of a predetermined offset type of a predetermined color component as a scale residual value of a remaining offset type. For example, when scale_merge of a predetermined color component i is 1, a value of delta_scale [i][1] may be set as a value of delta_scale [i][2] . . . delta_scale[i][M]. Here, the number of offsets is designated by M.

When scale_merge is 0, it may indicate that a predetermined color component of a current block does not have a common scale residual value. Accordingly, the scale parameter reconstruction unit 64 may parse a scale residual value for each offset type relative to a predetermined color component.

The scale parameter reconstruction unit 64 may reconstruct a scale value for each color component and/or for each offset type on the basis of both a scale default value and a scale residual value. The scale value may be defined as 'scale[i][j]', an index of a color component may be designated by i, and an index of an offset may be designated by j.

The offset determination unit 65 may scale an offset value by using a scale value of a color component and/or an offset of a current block. For example, the offset determination unit may upscale an offset by shift operation or multiplication operation using a scale value.

The offset application unit 66 may determine an edge category or a pixel value band of a reconstructed pixel on the basis of an edge class or a band position of a current block. The offset application unit 66 may adjust reconstructed pixels as much as an offset value by using an edge category determined for each reconstructed pixel or using an offset value (specifically, an upscaled offset value) relative to a pixel value band.

A dependent merging method and an independent merging method will be disclosed in detail based on the above-described description.

Figure 7:
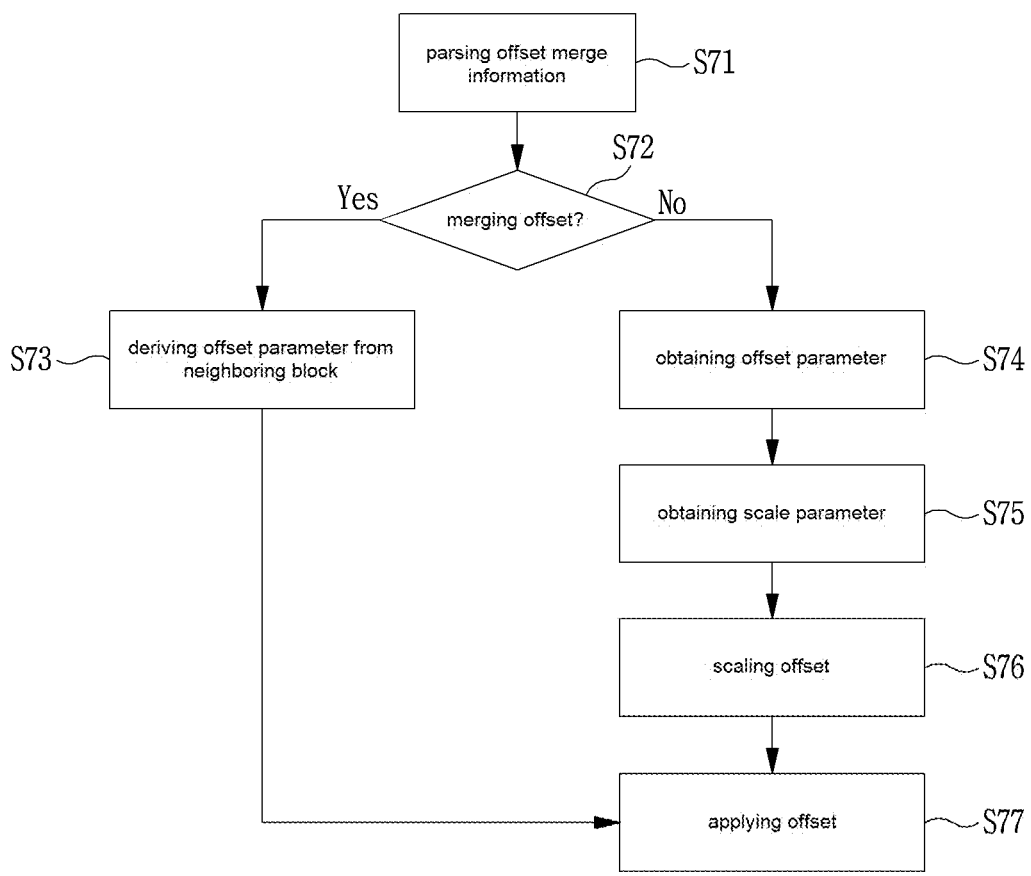
FIG. 7 is a flow chart showing a process of determining a scale value under a dependent merging method according to an embodiment of the present invention.

FIG. 7 is a flow chart showing a process of determining a scale value under a dependent merging method according to an embodiment of the present invention.

First, the decoder may parse, from a bitstream, offset merge information indicating whether or not an offset parameter of a current block is the same as at least one of neighboring blocks adjacent to a current block at step S71.

On the basis of the offset merge information, the decoder may determine whether or not an offset parameter and a scale parameter of a current block are merged into a neighboring block adjacent to a current block at step S72. When the offset merge information indicates that the offset parameter and the scale parameter of the current block are the same as at least one of neighboring blocks adjacent to the current block, an offset parameter may be derived from a neighboring block at step S73.

Specifically, when an offset parameter of a current block is merged into a neighboring block, the decoder may derive an offset parameter of a current block by using an offset parameter of a neighboring block without parsing an offset parameter from a bitstream. Here, an offset parameter being derived may include an offset type and an offset value.

A range of a neighboring block adjacent to a current block will be disclosed later with reference to FIGS. 8A and 8B.

An offset value of a neighboring block is a previously upscaled offset value. Therefore, when an offset parameter of a current block is merged into a neighboring block, it is unnecessary to parse a scale parameter. Accordingly, when an offset parameter of a current block is merged into a neighboring block, a process of reconstructing a scale parameter may be omitted.

When offset merge information indicates that an offset parameter and a scale parameter of a current block is different from a neighboring block adjacent to a current block at step S72, an offset parameter and a scale parameter may be obtained from a bitstream at steps S74 and S75.

Specifically, when an offset parameter of a current block is not merged into a neighboring block, the decoder may parse an offset parameter from a bitstream at step S74. Here, an offset parameter being decoded may include an offset type and an offset value.

In addition, the decoder may parse a scale parameter from a bitstream at step S75. The scale parameter may include at least one of information for obtaining a default scale value and information for obtaining a scale residual value.

For example, the decoder may perform entropy decoding on information of a scale default value, and on the basis thereof, a default scale value for each pixel band of a current block may be obtained.

In addition, the decoder may parse and reconstruct a scale residual value for each color component and/or for each offset type on the basis of merge information indicating whether or not scale residual values between color components of a current block are the same, merge information indicating whether or not a scale residual value of one color component of a current block is applied to remaining color components, etc.

A process of parsing a scale residual value from a bitstream will be disclosed later with reference to FIG. 9.

The decoder may obtain a scale value of a predetermined color component and/or of an offset by using a scale default value and a scale residual value. In addition, the decoder may upscale an offset value for each color component of a current block by using a scale value at step S76. Here, scaling may be performed on the basis of bit shift operation or multiplication operation.

When an offset value for each color component of a current block is determined, the decoder may apply an in-loop filter to a current block by using an offset value at step S77. Specifically, the decoder may determine an edge category or a pixel value band of a reconstructed pixel on the basis of an edge class or a pixel band of a current block, and may adjust a reconstructed pixel as much as an offset by using an offset value relative to the determined edge category or pixel band.

Figure 8A:
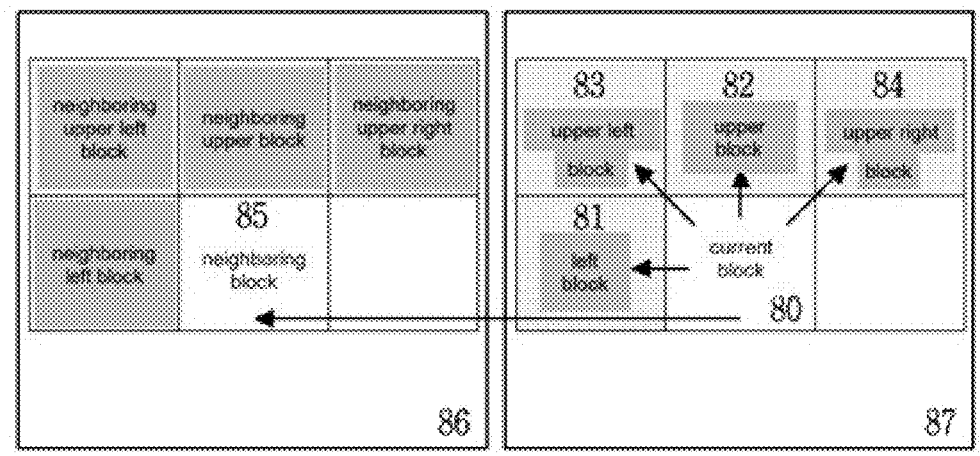
FIGS. 8A and 8B are views showing examples of a neighboring block that is used in offset merging.
Figure 8B:
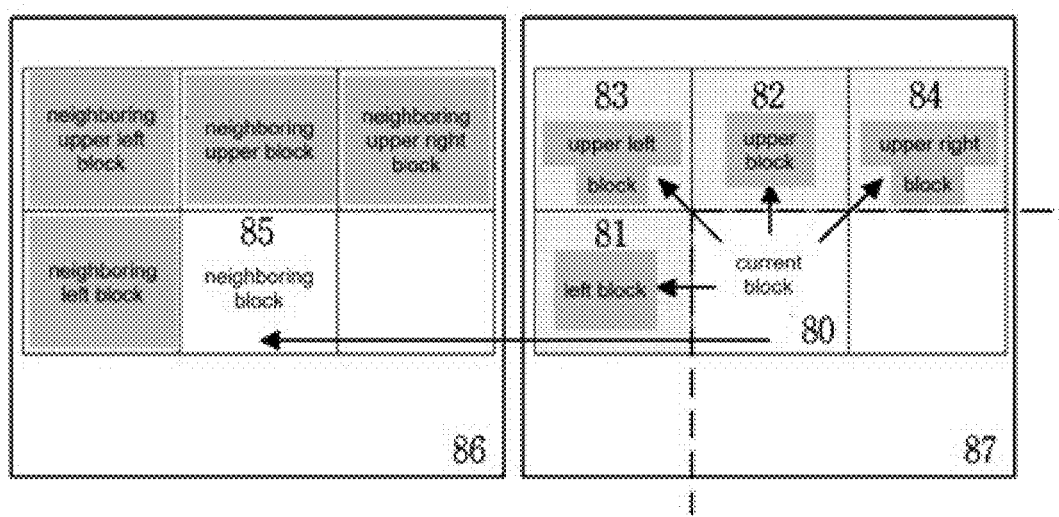

FIGS. 8A and 8B are views showing examples of a neighboring block that is used in offset merging.

The decoder may determine a candidate list for referring to an offset parameter and a scale parameter of a current block on the basis of neighboring blocks that are reconstructed in advance of a current block. For example, the decoder may generate a candidate list on the basis of a neighboring block that is a reference target of an offset parameter and a scale parameter of a current block. Alternatively, the decoder may generate a candidate list on the basis of a merge candidate having at least one of an offset parameter and a scale parameter of a neighboring block.

Here, a neighboring block neighboring a current block may be included in a frame (namely, a picture) 87 that is the same as a current block, and may include a neighboring block adjacent to a current block. For example, a category of a neighboring block may include at least one of a left neighboring block 81, an upper neighboring block 82, a upper left neighboring block 83, and a upper right neighboring block 84 of a current block 80 as shown in FIG. 8A.

A neighboring block may be a block included in a frame (namely, a picture) 86, which is reconstructed in advance of a current frame 87, having a temporal order different from that of a current block. For example, a category of a neighboring block may include a block 85 that is temporally positioned at the front/rear of a current frame, and is spatially positioned at the same position as a current block as shown in FIG. 8A. Accordingly, a candidate list may be generated on the basis of at least one of neighboring blocks 81, 82, 83, and 84 that are spatially adjacent to a current block in a current frame 87 including a current block, and a block 85 included in a frame 86 having a temporal order different from that of a current frame.

When a spatial neighboring block of a current block is included in a slice or a tile different from a current block, the neighboring block may be determined to be unavailable. That is, an offset parameter and a scale parameter of a neighboring block included in a slice or a tile different from a current block may not be referred. For example, as shown in FIG. 8B, spatial neighboring blocks 81, 82, 83, and 84 of a current block 80 are included in respective slices and/or respective tiles different from a current block 80, and thus, it is impossible to use spatial neighboring blocks 81, 82, 83, and 84 as candidates for merging an offset parameter and a scale parameter. In this case, a candidate list may be generated on the basis of a temporal neighboring block 85 (namely, a block included in a picture 86 having a temporal order different from that of a current picture 87).

The decoder may parse an index from a bitstream, and an offset parameter and a scale parameter of a candidate indicated by the index may be used in a current block. Here, an index may indicate at least one of candidates of a candidate list.

When offset parameters and scale parameters of all candidates of a candidate list are respectively different from an offset parameter and a scale parameter of a current block, the decoder may parse an offset parameter and a scale parameter from a bitstream to reconstruct the offset parameter and the scale parameter.

Figure 9:
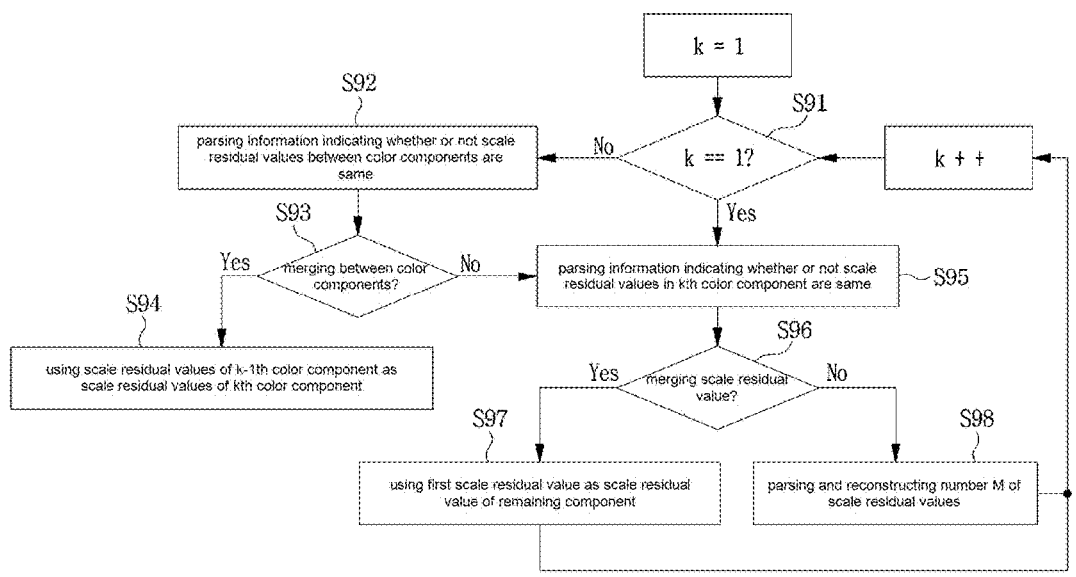
FIG. 9 is a flow chart showing an example of a process of parsing a scale parameter from a bitstream.

FIG. 9 is a flow chart showing an example of a process of parsing a scale parameter from a bitstream. Through a process of FIG. 9, it is possible to obtain a scale residual value for each color component and/or for each offset type of a current block. In FIG. 9, an index of a color component is designated by k.

First, when a color component of a current block is not the first color component at step S91, the decoder may parse information indicating whether or not scale residual values between color components are the same at step S92. Here, the information indicating whether or not scale residual values between color components are the same may be 'scale_merge_color[k]' that indicates whether or not a scale residual value of a color component is the same as a scale residual value of a previous color component. 'scale_merge_color[k]' indicates whether or not the kth color component and the k−1th color component have the same scale residual value.

When scale residual values between color components are the same at step S93, a scale residual value of the k−1th color component may be used as a scale residual value of the kth color component at step S94.

In contrast, when scale residual values between color components are different from each other at step S93, or when a color component of a current block is the first color component at step S91, the decoder may parse merge information indicating whether or not scale residual values in a color component are the same at step S95.

When scale residual values of a predetermined color component are the same at step S96, the first scale residual value may be parsed and reconstructed, and may be used as a remaining scale residual value of a predetermined color component at step S97. For example, the first scale residual value delta_scale[i][1] of a predetermined color component i may be used as delta_scale[i][2] . . . delta_scale[i][M] that is a remaining scale residual value of a predetermined color component. The number of offsets is designated by M.

When scale residual values of a predetermined color component are different from each other at step S97, the decoder may reconstruct a scale residual value by parsing the scale residual value for each offset type at step S98.

Next, a process of obtaining a scale value by using an independent merging method will be disclosed in detail.

Figure 10:
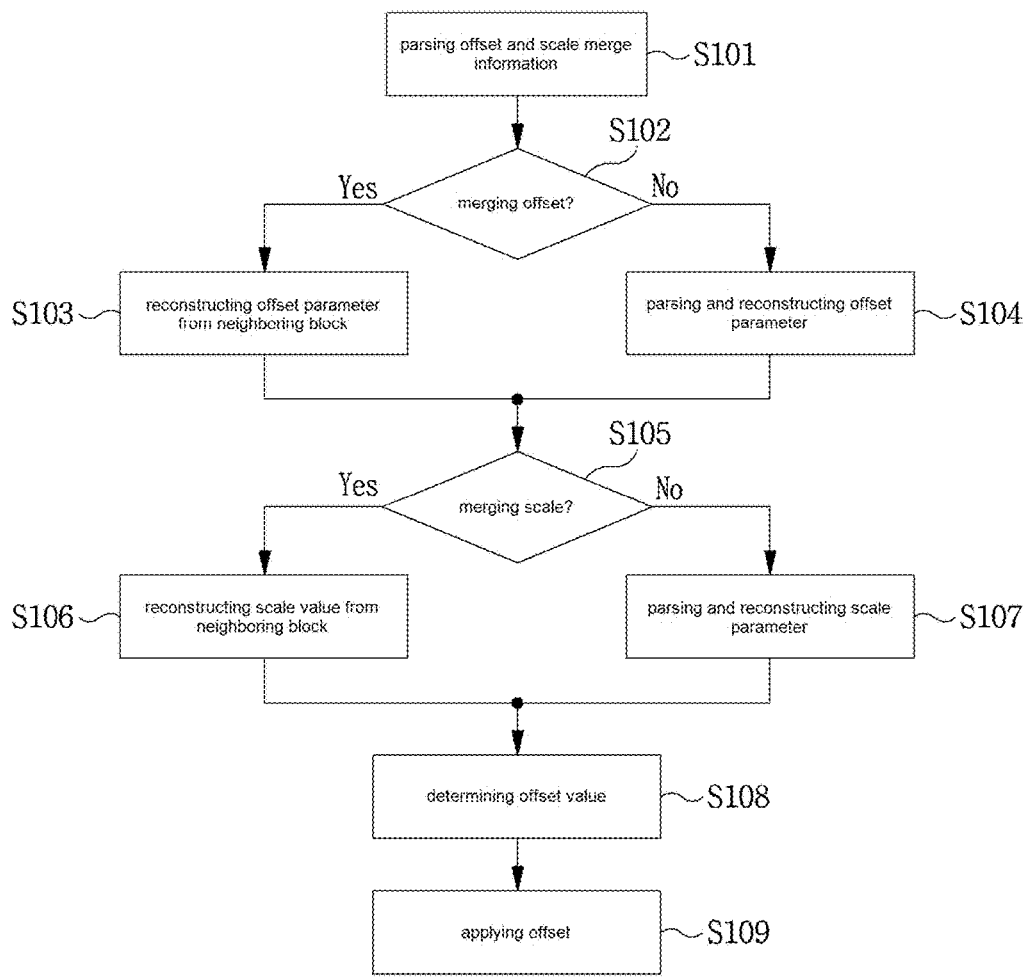
FIG. 10 is a flow chart showing a process of determining a scale value under an independent merging method according to an embodiment of the present invention.

FIG. 10 is a flow chart showing a process of determining a scale value under an independent merging method according to an embodiment of the present invention.

First, the decoder may parse, from a bitstream, both offset merge information indicating whether or not an offset parameter of a current block is the same as at least one of neighboring blocks adjacent to a current block, and scale merge information indicating whether or not a scale parameter of a current block is the same as at least one of neighboring blocks adjacent to a current block at step S101.

When the offset merge information indicates that an offset parameter and a scale parameter of a current block is the same as at least one of neighboring blocks adjacent to a current block at step S102, an offset parameter may be derived from a neighboring block at step S103.

Specifically, when an offset parameter of a current block is merged into a neighboring block, the decoder may derive an offset parameter of a current block by using an offset parameter of a neighboring block without parsing an offset parameter from a bitstream. Here, an offset parameter being derived may include an offset type and an offset value.

Here, a range of a neighboring block adjacent to a current block is the same as the above-described description with reference to FIGS. 8A and 8B.

When the offset merge information indicates that an offset parameter and a scale parameter of a current block is different from a neighboring block adjacent to a current block at step S102, an offset parameter may be obtained from a bitstream at step S104. Specifically, when an offset parameter of a current block is not merged into a neighboring block, the decoder may parse an offset parameter from a bitstream. Here, an offset parameter being decoded may include an offset type and an offset value.

Next, the decoder may determine whether or not a scale parameter of a current block is merged into a neighboring block on the basis of the scale merge information at step S105. When the scale merge information indicates that a scale parameter of a current block is the same as at least one of neighboring blocks adjacent to a current block, a scale parameter may be derived from a neighboring block at step S106.

Here, a range of a neighboring block adjacent to a current block is the same as the above-described description with reference to FIGS. 8A and 8B.

Specifically, when a scale parameter of a current block is merged into a neighboring block, the decoder may use a scale parameter of a neighboring block as a scale parameter of a current block without parsing a scale parameter from a bitstream. For example, the decoder may use a scale value of a neighboring block as a scale value of a current block.

When a scale parameter of a current block is not merged into a neighboring block, the decoder may derive a scale parameter from a bitstream at step S107. The scale parameter may include at least one of information for obtaining a default scale value and information for obtaining a scale residual value.

An example described with reference to FIGS. 8A and 8B may be determined as a range of a neighboring block into which an offset parameter or a scale parameter or both are merged. In addition, an example described with reference to FIG. 9 may be applied to a process of parsing a scale parameter from a bitstream under the independent merging method.

The decoder may obtain a scale value of a predetermined color component and/or of an offset by using a default scale value and a scale residual value. In addition, the decoder may upscale an offset value for each color component of a current block by using the scale value at step S108. Here, scaling may be performed on the basis of bit shift operation or multiplication operation.

When an offset value for each color component of a current block is determined, the decoder may apply an in-loop filter to a current block by using an offset value at step S109. Specifically, the decoder may determine an edge category or a pixel value band of a reconstructed pixel on the basis of an edge class or a pixel band of a current block, and may adjust a reconstructed pixel as much as an offset by using an offset value relative to the determined edge category or pixel band.

Under an independent merging method, when an offset parameter of a current block is merged into a neighboring block, an offset parameter of a neighboring block may be used as an offset parameter of a current block. Here, an offset value obtained from an offset may be a value before scaling is applied, or may be a value after scaling is applied.

When an offset value is obtained before scaling is applied, an offset may be scaled on the basis of a scale value obtained at a subsequent step.

When, a scaled offset value of a neighboring block is used as an offset value of a current block, there is no actual profit to obtain a scale parameter of a current block. Accordingly, unlike an example of FIG. 10, when an offset parameter of a current block is merged into a neighboring block, a process of obtaining a scale parameter of a current block may be omitted. That is, only when an offset parameter of a current block is merged into a neighboring block, merge possibility of a scale parameter may be independently determined on the basis of scale parameter merge information.

The decoder may use one of the dependent merging method and the independent merging method as default, and may selectively use one thereof on the basis of information parsed from a bitstream. For example, the decoder may perform, from a bitstream, entropy decoding on information indicating whether or not scale merge information is signaled, and may determine whether the dependent merging method is used or the independent merging method is used on the basis of the information.

For example, when the information indicates that the scale merge information is not signaled, a scale value may be reconstructed by using the dependent merging method. When the information indicates that the scale merge information is signaled, a scale value may be reconstructed by using the independent merging method. The information indicating whether or not scale merge information is signaled may be 1 bit flag information, without being limited thereto.

In the above-described embodiments, an in-loop filter is applied to a reconstructed block on the basis of an offset. For another example, when determining that a deblocking filter is applied to a reconstructed block, filtering based on an offset and filtering based on a sample adaptive filter (SAF) may be performed on a reconstructed block. Hereinafter, an example of selectively performing filtering based on an offset and filtering based on the SAF will be disclosed in detail with reference to the following embodiments.

The decoder may obtain information of whether or not an in-loop filter is applied through a bitstream. Here, the information of whether or not an in-loop filter is applied may be obtained for each color component. The information of whether or not an in-loop filter is applied may be a 1 bit flag, without being limited thereto. The information of whether or not an in-loop filter is applied may be encoded/signaled for each predetermined unit. For example, the information of whether or not an in-loop filter is applied may be encoded/signaled for each picture group, each picture, each slice, each encoding/decoding block, etc.

Accordingly, when information of whether or not an in-loop filter is applied is encoded for each video sequence, the information may be parsed by the sequence parameter set parsing unit 41. Alternatively, when information of whether an in-loop filter is applied for each color component is encoded for each encoding/decoding block (for example, a CTU or a CU), etc., the information may be parsed by the encoding unit information parsing unit 44.

When determining that an in-loop filter is applied (for example, when a value of a flag indicating whether or not an in-loop filter is applied is 1), the decoder may determine whether or not a SAF is applied to a reconstructed block. Whether or not a SAF is applied may be determined on the basis of information being parsed from a bitstream. Here, whether or not a SAF is applied may be obtained for each color component. Information of whether or not a SAF is applied may be a 1 bit flag, without being limited thereto. The information of whether or not a SAF is applied may be encoded/signaled for each picture group, each picture, each slice, each encoding/decoding block, etc.

Accordingly, when the information of whether or not a SAF is applied is encoded for each video sequence, the information may be parsed by the sequence parameter set parsing unit 41. Alternatively, when information of whether or not an in-loop filter is applied for each color component is encoded for each encoding/decoding block (for example, a CTU or a CU), etc., the information may be parsed by the encoding unit information parsing unit 44.

Whether or not a SAF is applied may be determined on the basis of information being obtained from a bitstream, without being limited thereto. Whether or not a SAF is applied may be determined depending on whether or not an in-loop filter is applied. For example, when determining that an in-loop filter is applied, a SAF may also be applied. When determining that an in-loop filter is not applied, a SAF may also not be applied.

A method of applying an in-loop filter to a reconstructed block will be disclosed in detail based on the above-described description.

Figure 11:
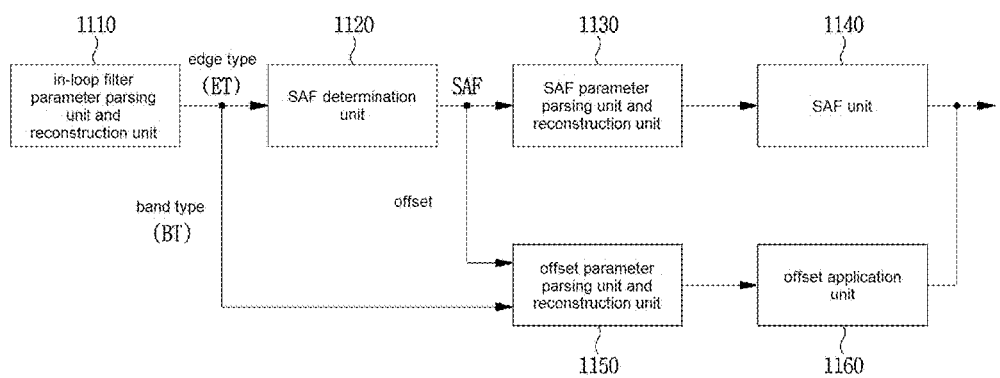
FIG. 11 is a block diagram showing a decoder according to an embodiment of the present invention.

FIG. 11 is a block diagram showing a decoder according to an embodiment of the present invention.

Referring to FIG. 11, the decoder may include an in-loop filter parameter parsing unit and reconstruction unit 1110, a SAF determination unit 1120, a SAF parameter parsing unit and reconstruction unit 1130, a SAF unit 1140, an offset parameter parsing unit and reconstruction unit 1150, and an offset application unit 1160. Configurations of FIG. 11 may be a part of both the entropy decoding unit 210 and the filter unit 260 shown in FIG. 2, or may be implemented separately therefrom.

The in-loop filter parameter parsing unit and reconstruction unit 1110 may parse merge information indicating whether or not an in-loop filter parameter of a current block is the same as at least one of neighboring blocks adjacent to a current block. Here, the in-loop filter parameter may include information of a pixel adjustment type and/or information of an application method, etc.

The information of a pixel adjustment type indicates whether an application type of an in-loop filter is an edge type (ET) or a band type (BT). Information of adjustment method indicates one of a method of performing sample adjustment by using an offset (hereinafter, referred to as 'offset adjustment method'), and a method of performing sample adjustment by using a SAF (hereinafter, referred to as 'SAF method').

When a pixel adjustment type is an edge type, information of an application method may indicate one of an offset adjustment method and a SAF method. In contrast, when a pixel adjustment type is a band type, an application method may be determined as an offset adjustment method not a SAF method. Accordingly, when a pixel adjustment type is a band type, information of an application method may not be obtained.

When an in-loop filter parameter of a current block is different from a neighboring block (namely, when a current block is not in-loop merged with a neighboring block), the in-loop filter parameter parsing unit and reconstruction unit 1110 may determine whether a pixel adjustment type of a current block is an edge type or a band type by parsing pixel adjustment information from a bitstream. When a pixel adjustment type of a current block is an edge type, the SAF determination unit 1120 may determine whether an application method of an in-loop filter is an offset adjustment method or a SAF method.

When a pixel adjustment type is an edge type and a sample adjustment method is a SAF method, reconstructed pixels may be adjusted by the SAF parameter parsing unit and reconstruction unit 1130, and the SAF unit 1140.

More specifically, first, the SAF parameter parsing unit and reconstruction unit 1130 may determine an edge class and a filtering type.

The edge class may be determined on the basis of information being obtained from a bitstream, or may be adaptively determined depending on local image characteristics. The SAF parameter parsing unit and reconstruction unit 1130 may obtain, from a bitstream, information indicating whether or not an edge class is adaptively determined. The information indicating whether or not an edge class is adaptively determined may be a 1 bit flag, without being limited thereto. The SAF parameter parsing unit and reconstruction unit 1130 may obtain information indicating an edge class from a bitstream depending on whether or not an edge class is adaptively determined, or may adaptively determine an edge class depending on local image characteristics.

A filtering type may include an explicit filtering type and an implicit filtering type. The explicit filtering type may mean a method of obtaining a filter coefficient of a SAF from a bitstream, and the implicit filtering type may mean a method that does not parse a filter coefficient of a SAF.

The SAF parameter parsing unit and reconstruction unit 1130 may obtain a filter coefficient of a SAF from a bitstream when a filtering type indicates an explicit filtering type. In contrast, when a filtering type indicates an implicit filtering type, the SAF parameter parsing unit and reconstruction unit 1130 may determine a filter coefficient of a SAF on the basis of a predetermined method.

The SAF unit 1140 may adjust a reconstructed pixel on the basis of the determined edge class and filtering type.

When a pixel adjustment type is an edge type or a band type and a sample adjustment method is an offset method, the offset parameter parsing unit and reconstruction unit 1150 and the offset adjustment unit 1160 may adjust reconstructed pixels.

More specifically, first, the offset parameter parsing unit and reconstruction unit 1150 may reconstruct an offset value by parsing the offset value. In addition, when a pixel adjustment type is a band type, the offset parameter parsing unit and reconstruction unit 1150 may reconstruct a pixel value band by parsing the pixel value band more. Here, an offset value may be determined by the offset parameter and the scale parameter.

The offset adjustment unit 1160 may determine an edge category or a pixel value band of a reconstructed pixel on the basis of an edge class or a pixel value band of a current block. The offset adjustment unit 1160 may determine an offset value relative to an edge category or a pixel value band of each of reconstructed pixels, and may adjust a reconstructed pixel on the basis of the determined offset value. Here, adjustment of a reconstructed pixel may be performed by adding an offset value to a, or by subtracting an offset value from a value of a reconstructed pixel.

Figure 12:
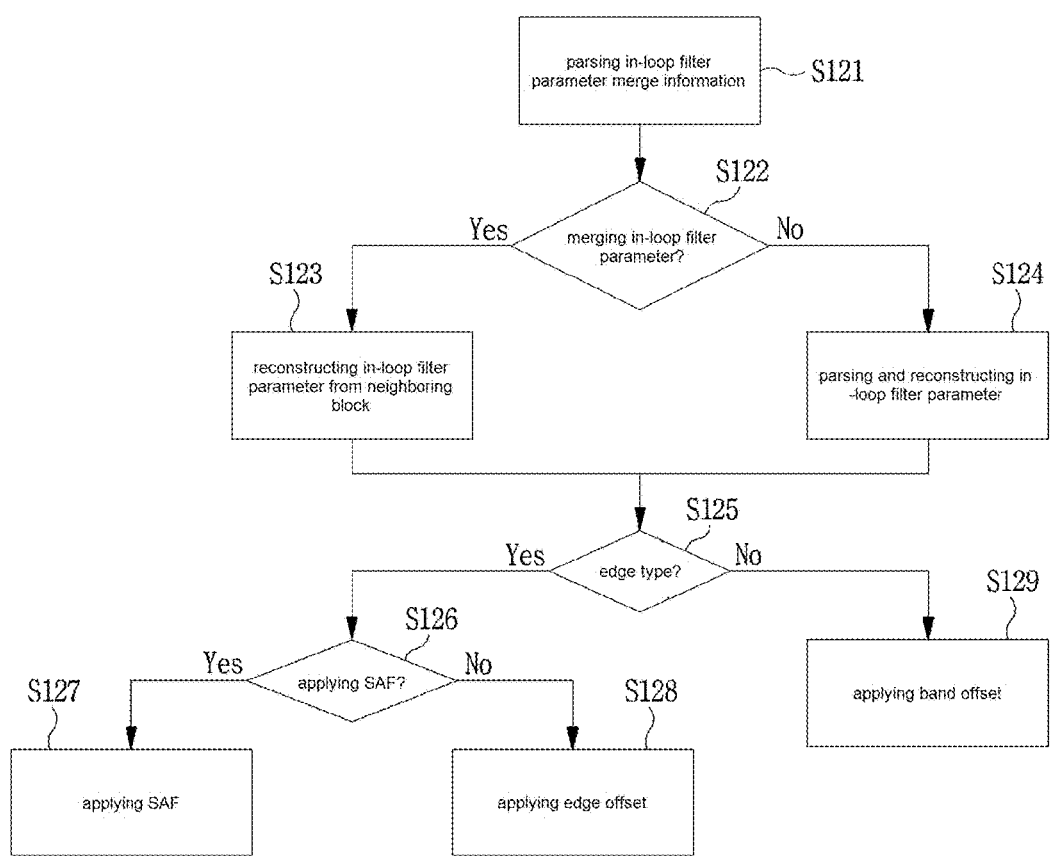
FIG. 12 is a flow chart showing an in-loop filtering method according to an embodiment of the present invention.

FIG. 12 is a flow chart showing an in-loop filtering method according to an embodiment of the present invention.

Referring to FIG. 12, first, information indicating whether or not an in-loop filter parameter of a current block is the same as an in-loop filter parameter of a neighboring block adjacent to a current block is parsed, and the information is reconstructed at step S121. When the information indicates that an in-loop filter parameter of a current block is the same as an in-loop filter parameter of a neighboring block at step S122, an in-loop filter parameter of a current block may be reconstructed by using an in-loop filter parameter of a neighboring block without parsing an in-loop filter parameter of a current block at step S123.

Here, a range of a neighboring block adjacent to a current block is the same as the above-described description with reference to FIGS. 8A and 8B. Specifically, the decoder may determine a candidate list for referring an in-loop filter parameter and a SAF parameter of a current block on the basis of neighboring blocks that are reconstructed in advance of a current block. Here, a neighboring block may include at least one of a left neighboring block 81, an upper neighboring block 82, an upper left neighboring block 83, an upper right neighboring block 84 of a current block 80, which are included in a frame 87 including a current block.

In addition, a neighboring block may include a block 85 spatially positioned at the same position as a current block, the block 85 being included in a frame (namely, a picture) 86, which is reconstructed in advance of a current frame 87, having a temporal order different from that of a current block.

When a spatial neighboring block of a current block is included in a slice or a tile different from a current block, that the neighboring block may be determined to be unusable is the same as the above-described description with reference to FIGS. 8A and 8B.

The decoder may parse an index from a bitstream, and an in-loop filter parameter and a SAF parameter of a candidate indicated by the index may be used in a current block. Here, the index may indicate at least one of candidates of a candidate list.

Unlike the above-described example, when an in-loop filter parameter of a current block is not merged into a neighboring block at step S122, an in-loop filter parameter of a current block may be parsed from a bitstream and may be reconstructed at step S124.

Accordingly, when an in-loop filter parameter of a current block is merged into a neighboring block, a pixel adjustment type and an application method may be determined on the basis of an in-loop parameter of a neighboring block. In contrast, when an in-loop filter parameter of a current block is not merged into a neighboring block, a pixel adjustment type and an application method may be determined on the basis of information obtained from a bitstream.

When determining that a pixel adjustment type of a current block is an edge type on the basis of an in-loop filter parameter reconstructed from a neighboring block or of an in-loop filter parameter obtained from a bitstream at step S125, whether or not an application method of an in-loop filter is a SAF method may be determined at step S126.

When an application method of an in-loop filter is a SAF method, a SAF parameter may be determined, and a SAF may be applied on the basis of the determined SAF parameter at step S127. Here, when an in-loop filter parameter of a current block is merged into a neighboring block, a SAF parameter of a neighboring block may be reconstructed into a SAF parameter of a current block. In contrast, when an in-loop filter parameter of a current block is not merged into a neighboring block, a SAF parameter may be determined on the basis of information obtained from a bitstream.

Figure 13:
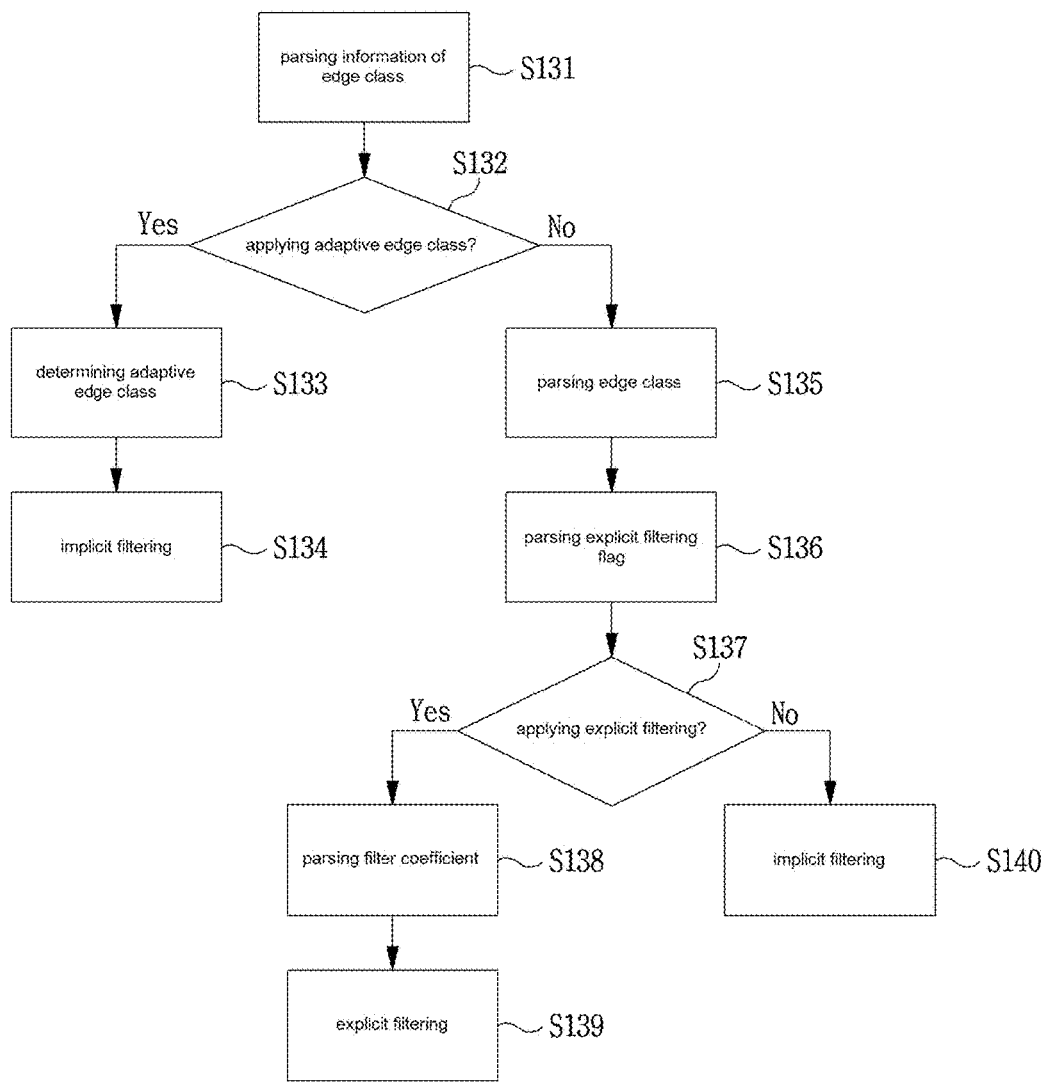
FIG. 13 is a flow chart showing a process of parsing and reconstructing a SAF parameter from a bitstream.

Reconstructing a SAF parameter by obtaining the SAF parameter from a bitstream will be disclosed in detail with reference to FIG. 13.

When a pixel adjustment type is an edge type, or when an application method of an in-loop filter is not a SAF method (namely, in a case of an offset method), an offset parameter may be determined, and an edge offset may be applied on the basis of the determined offset parameter at step S128. Here, when an in-loop filter parameter of a current block is merged into a neighboring block, an offset parameter of a neighboring block may be reconstructed into an offset parameter of a current block. In contrast, when an in-loop filter parameter of a current block is not merged into a neighboring block, an offset parameter may be determined on the basis of information obtained from a bitstream.

When a pixel adjustment type is not an edge type (namely, in a case of a band type), a pixel value band and an offset parameter may be determined, and a band offset may be applied on the basis of the determined pixel value band and the determined offset parameter at step S129. Here, when an in-loop filter parameter of a current block is merged into a neighboring block, a pixel value band and an offset parameter of a neighboring block may be respectively reconstructed into a pixel value band and an offset parameter of a current block. In contrast, when an in-loop filter parameter of a current block is not merged into a neighboring block, a pixel value band and an offset parameter may be determined on the basis of information obtained from a bitstream.

FIG. 13 is a flow chart showing a process of parsing and reconstructing a SAF parameter from a bitstream.

Referring to FIG. 13, first, information for determining an edge class of a SAF may be obtained from a bitstream at step S131. The information for determining an edge class indicates whether or not an edge class is adaptively determined depending on image characteristics. When determining that the edge class is adaptively determined on the basis of the information at step S132, the edge class may be adaptively determined depending on image characteristics at step S133.

Here, the edge class may mean a direction in which the sum of levels of an edge is the largest relative to a local image in a predetermined size having a reconstructed pixel to be adjusted as the central thereof. For example, relative to an N×M local image having a reconstructed pixel as the center thereof, an edge may be detected for each predetermined angle (for example, 0 degree angle, 45 degree angles, 90 degree angles, and 125 degree angles, etc.), and a direction (namely, an angle) in which the sum of levels of an edge is the largest may be determined as an edge class thereafter.

When an edge class is adaptively determined, a filtering type may be determined by performing implicit filtering at step S134. Implicit filtering means a method that a filter coefficient of a SAF is not explicitly obtained from a bitstream. When implicit filtering is applied, a filter coefficient of a SAF may be determined on the basis of a predetermined method by applying a linear filtering method using neighboring pixels adjacent to a reconstructed pixel.

When determining that an edge class is not adaptively determined, information for determining an edge class may be parsed from a bitstream at step S135, and an edge class may be determined on the basis of the parsed information.

In addition, information indicating whether a filtering type is explicit filtering or implicit filtering may be parsed at step S136, and a filtering type may be determined on the basis of the parsed information at step S137. When a filtering type is explicit filtering, a filter coefficient of a SAF may be parsed to be reconstructed at step S138, and filtering may be performed on each reconstructed pixel on the basis of the edge class and the reconstructed filter coefficient at step S139.

In contrast, when a filtering type is implicit filtering, a filter coefficient of a SAF may be determined on the basis of a predetermined method by applying a linear filtering method using neighboring pixels adjacent to a reconstructed pixel. By using the determined filter coefficient under an edge class and implicit filtering, filtering may be performed on each reconstructed pixel at step S140.

The components described in the exemplary embodiments of the present invention may be achieved by at least one of a digital signal processor (DSP), a processor, a controller, an application specific integrated circuit (asic), a programmable logic element such as a field programmable gate array (FPGA), other electronic devices, and combinations thereof. At least one of the functions or the processes described in the exemplary embodiments of the present invention may be achieved by software, and the software may be recorded on a recording medium. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention. Components, functions, processes, etc. according to the embodiments of the present invention may be implemented in the form of a combination of hardware and software.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention is industrially applicable in the industry field of encoding/decoding an image.

The invention claimed is:

1. A method for decoding a video signal, the method comprising:
    obtaining information of a scale default value of a current block from a bitstream;
    obtaining offset parameter merge information of the current block from the bitstream, wherein the offset parameter merge information indicates whether or not an offset parameter of the current block is the same as at least one of neighboring blocks adjacent to the current block;
    obtaining the offset parameter of the current block on the basis of the offset parameter merge information;
    determining whether or not a scale residual value of the current block is obtained from the bitstream on the basis of the offset parameter merge information, wherein when the offset parameter merge information indicates that the offset parameter of the current block is different from the neighboring blocks adjacent to the current block, the scale residual value is obtained from the bitstream;
    obtaining a scale value on the basis of the scale default value and the scale residual value;
    scaling an offset on the basis of the offset parameter and the scale value; and
    adjusting a pixel value of the current block on the basis of the scaled offset.

2. The method of claim 1, wherein when the offset parameter merge information indicates that the offset parameter of the current block is the same as at least one of the neighboring blocks adjacent to the current block, the scaled offset is derived from at least one of the neighboring blocks.

3. The method of claim 1, wherein a unit of signaling the scale default value and a unit of signaling the scale residual value are different from each other.

4. The method of claim 1, wherein the scale residual value is obtained for each color component and each offset type.

5. The method of claim 4, wherein a scale residual value of a predetermined color component is derived to be the same as a scale residual value of a previous color component.

6. The method of claim 4, wherein a scale residual value of a predetermined offset type of a predetermined color component is used as a scale residual value of a remaining offset type of the predetermined color component.

7. The method of claim 4, wherein the scale residual value indicates a difference between scale residual values of a predetermined color component and of a previous color component, or a difference between scale residual values of a predetermined offset type and of a previous offset type.

8. The method of claim 2, wherein a neighboring block includes at least one of a spatial neighboring block spatially adjacent to the current block, and a temporal neighboring block temporally adjacent to the current block.

9. The method of claim 8, wherein the offset parameter of the current block is derived from a neighboring block indicated by index information parsed from the bitstream.

10. A method for decoding a video signal, the method comprising:
obtaining offset parameter merge information and scale parameter merge information of a current block from a bitstream, wherein the offset parameter merge information indicates whether or not an offset parameter of the current block is the same as at least one of neighboring blocks adjacent to the current block, and the scale parameter merge information indicates whether or not a scale parameter of the current block is the same as at least one of the neighboring blocks adjacent to the current block;
obtaining the offset parameter of the current block on the basis of the offset parameter merge information;
obtaining the scale parameter of the current block on the basis of the scale parameter merge information;
scaling an offset on the basis of the offset parameter and the scale parameter; and
adjusting a pixel value of the current block on the basis of the scaled offset.

11. The method of claim 10, wherein the offset parameter of the current block is obtained from the bitstream or at least one of the neighboring blocks adjacent to the current block depending on the offset parameter merge information, and the scale parameter of the current block is obtained from the bitstream or at least one of the neighboring blocks adjacent to the current block depending on the scale parameter merge information.

12. The method of claim 10, wherein a scale value for scaling the offset is obtained on the basis of a scale default value and a scale residual value indicated by the scale parameter.

13. An apparatus for decoding a video signal, the apparatus comprising:
an offset merge information parsing unit obtaining offset parameter merge information of a current block from a bitstream, wherein the offset parameter merge information indicates whether or not an offset parameter of the current block is the same as at least one of neighboring blocks adjacent to the current block;
an offset parameter reconstruction unit obtaining the offset parameter of the current block on the basis of the offset parameter merge information;
a scale parameter reconstruction unit determining whether or not a scale parameter of the current block is obtained from the bitstream on the basis of the offset parameter merge information, wherein when the offset parameter merge information indicates that the offset parameter of the current block is different from the neighboring blocks adjacent to the current block, a scale residual value is obtained from the bitstream;
an offset determination unit obtaining a scale value on the basis of a scale default value and the scale residual value, and scaling an offset on the basis of the offset parameter and the scale value; and
an offset application unit adjusting a pixel value of the current block on the basis of the scaled offset.

14. The apparatus of claim 13, wherein when the offset parameter merge information indicates that the offset parameter of the current block is the same as at least one of the neighboring blocks adjacent to the current block, the scale parameter reconstruction unit derives the scale residual value of the current block from at least one of the neighboring blocks.

15. The apparatus of claim 13, wherein a unit of signaling the scale default value and a unit of signaling the scale residual value are different from each other.

16. The apparatus of claim 15, wherein the scale parameter reconstruction unit obtains the scale residual value for each color component and each offset type.

17. The apparatus of claim 16, wherein a scale residual value of a predetermined color component is derived to be the same as a scale residual value of a previous color component.

18. The apparatus of claim 16, wherein a scale residual value of a predetermined offset type of a predetermined color component is used as a scale residual value of a remaining offset type of the predetermined color component.

19. The apparatus of claim 14, wherein a neighboring block includes at least one of a spatial neighboring block spatially adjacent to the current block, and a temporal neighboring block temporally adjacent to the current block.

20. The apparatus of claim 19, wherein the offset parameter reconstruction unit derives the offset parameter of the current block from a neighboring block indicated by index information parsed from the bitstream.

* * * * *